United States Patent

[11] 3,608,766

[72] Inventor Rene D'Orefice
Saint-Jean-de-la-Ruelle, France
[21] Appl. No. 785,168
[22] Filed Dec. 19, 1968
[45] Patented Sept. 28, 1971
[73] Assignee Compaznie de Saint Gobain
Neuilly-Sur-Seine,
France
[32] Priority Dec. 22, 1967
[33] France
[31] PU 133,535

[54] TEMPERED STEMWARE AND PROCESS OF MAKING IT
5 Claims, 10 Drawing Figs.

[52] U.S. Cl .................................................. 215/99.5,
215/1 R, 65/104, 65/114, 65/DIG. 10
[51] Int. Cl ..................................................... C03b 27/00
[50] Field of Search ........................................... 65/114,
115, 104, 41, 69, DIG. 10; 215/1 R, 99.5

[56] References Cited
UNITED STATES PATENTS
2,254,227 9/1941 Lewis .......................... 65/115
2,344,630 3/1944 Mylchreest ................... 65/115

Primary Examiner—Arthur D. Kellogg
Attorney—Bauer and Seymour

ABSTRACT: Footed glassware is, for the first time, satisfactorily tempered by annealing hollow glassware, such as goblets and blowing them with air jets. The annealing raises the surface temperature of the stemware to about 660° to 680° C. in the cup and to about 490° to 500° C. in the midlength of the stem. The new glass is of superior resistance to mechanical and thermal shocks.

PATENTED SEP28 1971

INVENTOR.
RENE d'OREFICE

BY Bauer and Seymour
ATTORNEYS

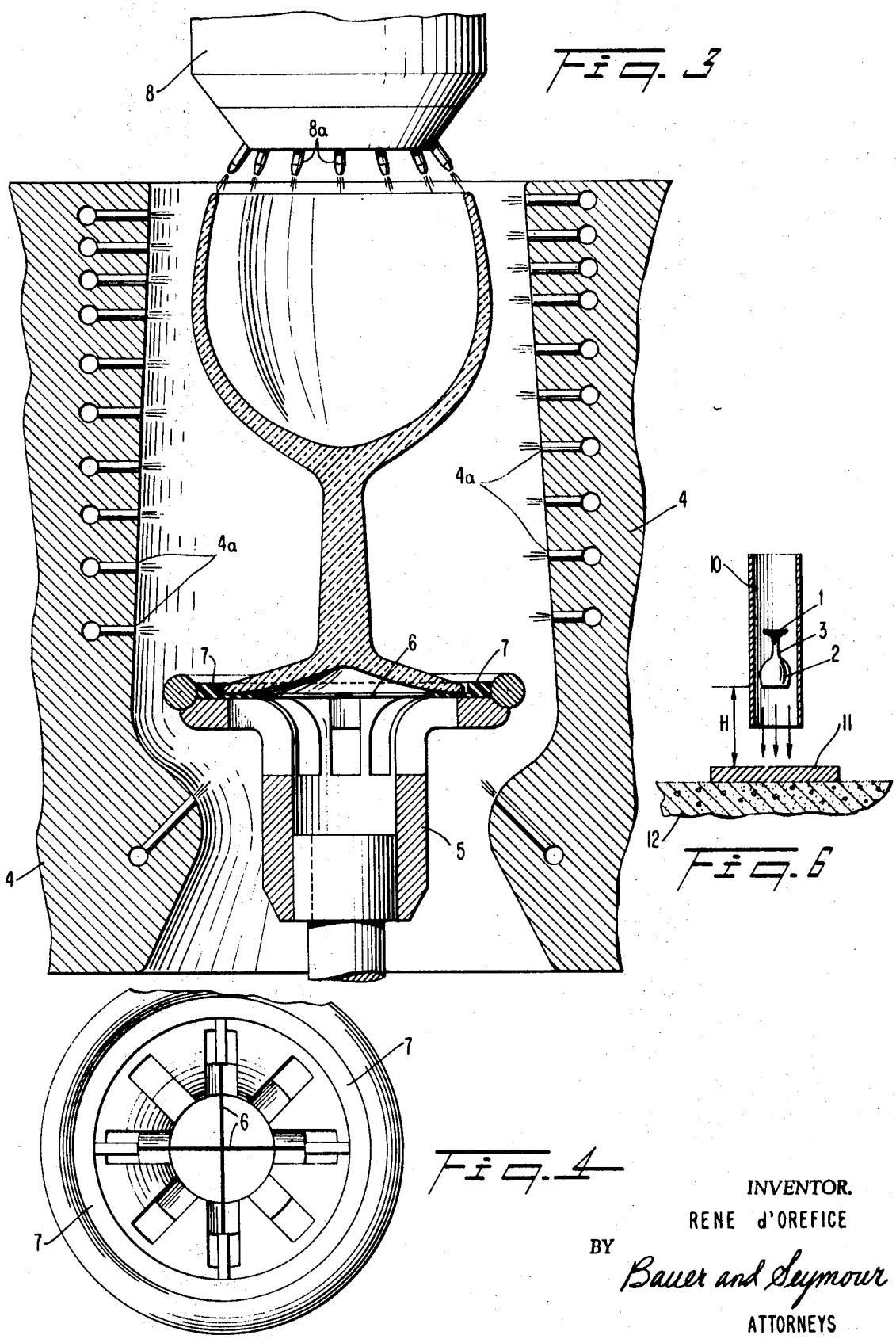

INVENTOR.
RENE d'OREFICE
BY
Bauer and Seymour
ATTORNEYS

TEMPERED STEMWARE AND PROCESS OF MAKING IT

The present invention relates to tempering stemware in glass of which goblets having cup, stem and foot of differing thicknesses are exemplary. Tempered stemware is believed to be a new product. The invention also relates to a novel method of making such stemware.

The tempering of glass is accomplished by heating the glass to a temperature approaching its softening point and chilling it rapidly to a temperature strain point. This sets up an internal condition of tension and an external condition of compression which imparts great strength to the glass. Tempering has long been carried out with satisfactory results on flat glass and on tumblers which have reasonable uniformity of thickness but the tempering of glass objects of which the thickness varies greatly has been accompanied by great difficulty and lack of success. The processes of internal mobility of the glass during thermal tempering are related to the thicknesses of the objects being tempered and if the different parts of the object have different thickness the different internal mobility which is imparted to different portions develops internal strains and unbalanced strains which produce fragility and frequently immediate rupture. For example, when the known processes for tempering ordinary drinking glasses which have no feet and no great differences of thickness are applied to stemware or footed pieces in which thicknesses vary widely from part to part, failure results.

It is an object of this invention to temper stemware and other hollow glass objects having material differences in thickness. Another object is to temper stemware with apparatus of the type customarily used in the tempering of tumblers. It will be recalled that in tempering tumblers the glasses are brought to a temperature on the order of 600° to 700° C. and are blown with cold air jets, usually at room temperature, which are directed against the inside and outside walls.

Objects of the present process invention are accomplished, generally speaking, by a method of tempering glass stemware which comprises establishing in the surface thereof a series of temperatures at which tempering can be accomplished by rapid chilling and which are inversely proportional to the thickness of the piece, being generally the lower as the thickness is the greater, and chilling the stemware at a tempering rate. In the present invention prior to the application of the air jets the glass is subjected to a thermal treatment such that its surface temperature averages 660° to 680° C. in the cup and between 490° and 500° C. in the midportion of the stem. When these temperatures are attained, the glass is blown with the air jets in accordance with accepted tumbler practice.

The stemware constituting a part of this invention have in all their parts, cup, foot and stem, a surface compression of at least 410 kg./cm.² which is distributed with satisfactory uniformity through all its parts so that if breakage occurs the glass falls into pieces of which the largest dimension is less than 3 cm. This invention is equally applicable to holloware which is footed but lacks stems in which the differential thickness prevents tempering by ordinary means. The following description is of the invention as applied to the tempering of glass goblets. It demonstrates the principles and serves as a preferred mode.

In the drawings, wherein like reference characters refer to like parts throughout the several views, FIG. 1 is a vertical section through a goblet indicating the range of temperature achieved in the surface before blowing;

FIG. 4 is a plan view of the support of FIG. 3;

FIG. 5 is a diagram indicating the mechanical resistance to shock of the novel glassware of this invention compared to identical glass annealed but not tempered;

FIG. 6 illustrates the test of shock resistance by free fall, being a vertical section through such apparatus in operation;

Figure 1:
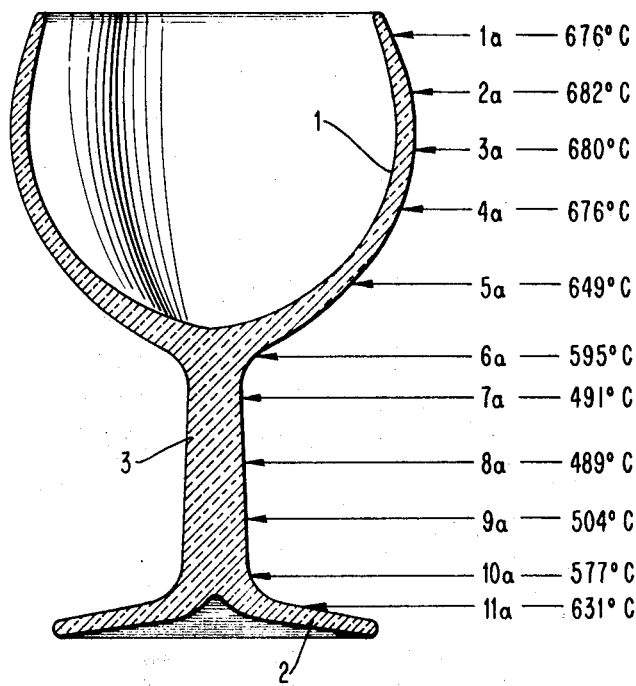

The footed glassware represented in the drawings is of the type sometimes called balloon and sometimes called goblet. It is made of white, ordinary soda-lime glass having a thermal coefficient of expansion of $87 \times 10^{17}$. It includes a cup 1, a foot 2 and a stem 3. The diameter of the stem is over four times the thickness of the upper part of the cup. The length of the stem is unimportant, the invention being useful regardless of its length, whether long or short to the point of nonexistence.

Figure 2:
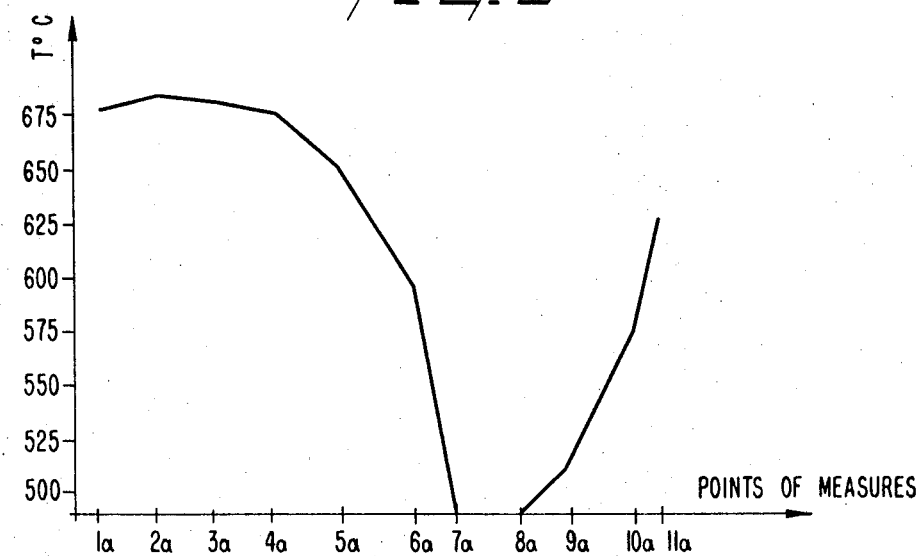
FIG. 2 is a diagram of surface temperatures in an operation similar to that of FIG. 1.
Figure 3:
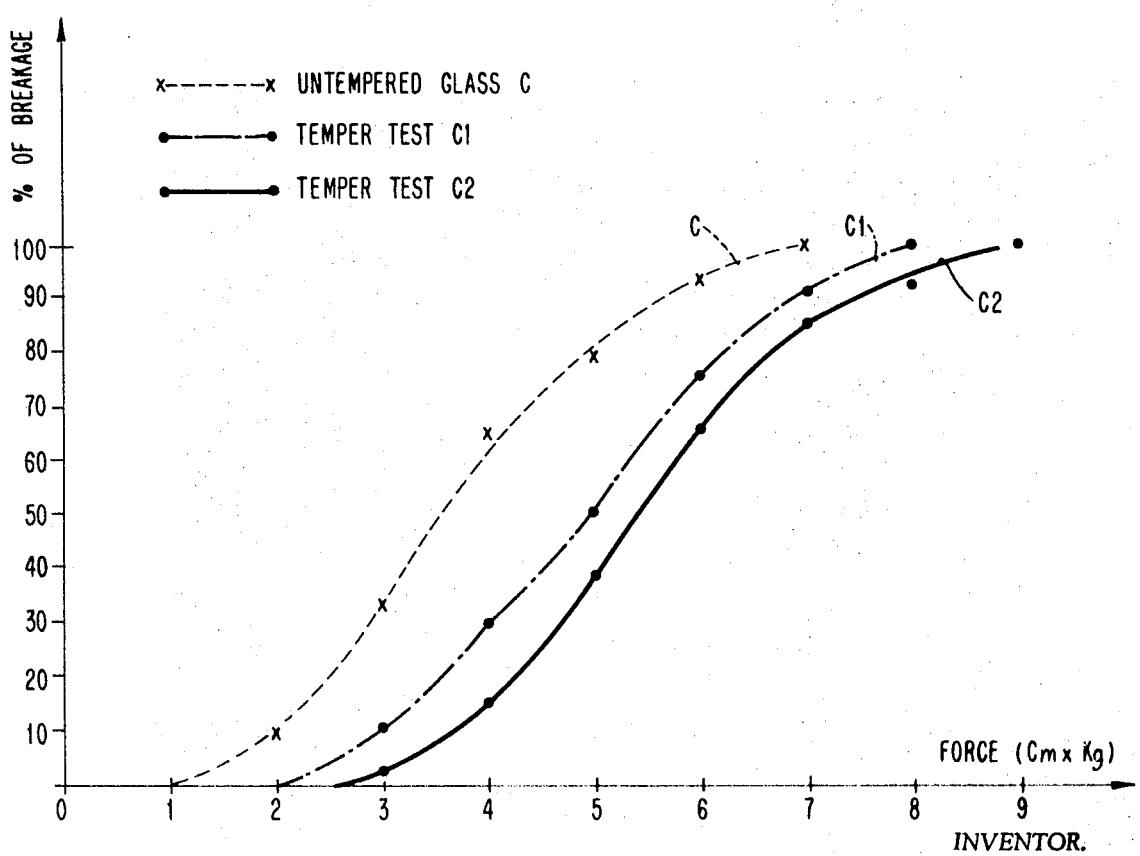
FIG. 3 is a vertical section through a goblet undergoing tempering.

The glass is first heated so as to bring the surface temperature of its different parts within the ranges indicated. This can be accomplished by the use of flame jets of different temperatures or by flame jets of the same temperature applied to different parts from different distances. In the preferred mode, of which the illustrated goblet is representative, the thermal treatment consisted in annealing the glass for 3 minutes 15 seconds in an electric furnace having a temperature of 720° C. Thus, only one temperature was applied but the desired temperature gradient was attained by limiting its duration. At the outlet of the furnace the surface temperatures were measured at 11 different points, from 1a to 11a on FIGS. 1 and 2, the values at each point being recorded on the figures. The average temperature of the cup, calculated by averaging the temperatures of points 1a to 5a was equal to about 672° C. and the average temperature of the midpart of the stem, averaged between points 5a and 9a was about 495° C. At these temperatures the glass was immediately transferred to the blowing enclosure of the type habitually used for tempering tumblers, wherein, as indicated in FIG. 3 at numeral 4, the glass rested on the support 5 provided with crossed rods 6 upon which it rested, being centered by buffers 7 so as to limit surface contact with the support to a minimum and so as to prevent the marking of the glass by the support. The walls of the enclosure 4 are provided with blowing orifices 4a directed upon the outside of the stemware. The jets were at room temperature at a relative pressure of 50 mm. of mercury. A blowing box 8 was disposed above the glass and coaxially with the enclosure 4. The blowing box was provided with blowing nozzles 8a which blew jets of air at room temperature at a pressure of 120 mm. of mercury into the cup 1. Under these circumstances, the footed glassware developed a surface compression throughout of at least 410 kg./cm.² and they were endowed with thermal and mechanical resistance far superior to that of the same glass not tempered but which had been subjected to the same annealing process. The values of these tests are shown in FIGS. 5 to 8 wherein the results corresponding to untempered glass are represented by curve C in dash lines and the results corresponding to the tempered stemware in curves $C_1$ and $C_2$ of which the conditions applied in $C_1$ differed somewhat from those applied in $C_2$. The curve $C_1$ records the testing of goblets of which the rim was 16 mm. from the box 8 during tempering, while curve $C_2$ represented the result where the rim was disposed 8 mm. from the box.

In FIG. 5 are shown the results of classical mechanical resistance tests according to the Preston system. In that test, the cups of the stemware are struck at midheight by a pendulum. In the drawing, the percentages of broken glass are shown in ordinates and the force exerted by the pendulum in kilogram-centimeters in abscissas. These tests demonstrated that the new glassware is much more resistant than that which has not been so treated. For example, for a shock of 2 kilogram-centimeters 10 percent of the untreated glass broke but none of the tempered glass. For a shock of 3 kcm. about a third of the untreated glass broke as against 10 percent of the tempered. For a shock of 4 kcm. 65 percent of the untempered glass broke as against 40 to 50 percent of the tempered glass. At a force of 7 kilogram-centimeters all the untempered glasses broke, whereas it was necessary to increase the force of the stroke to 8 and 9 kilogram-centimeters respectively, to break all the tempered glasses.

Figure 7:
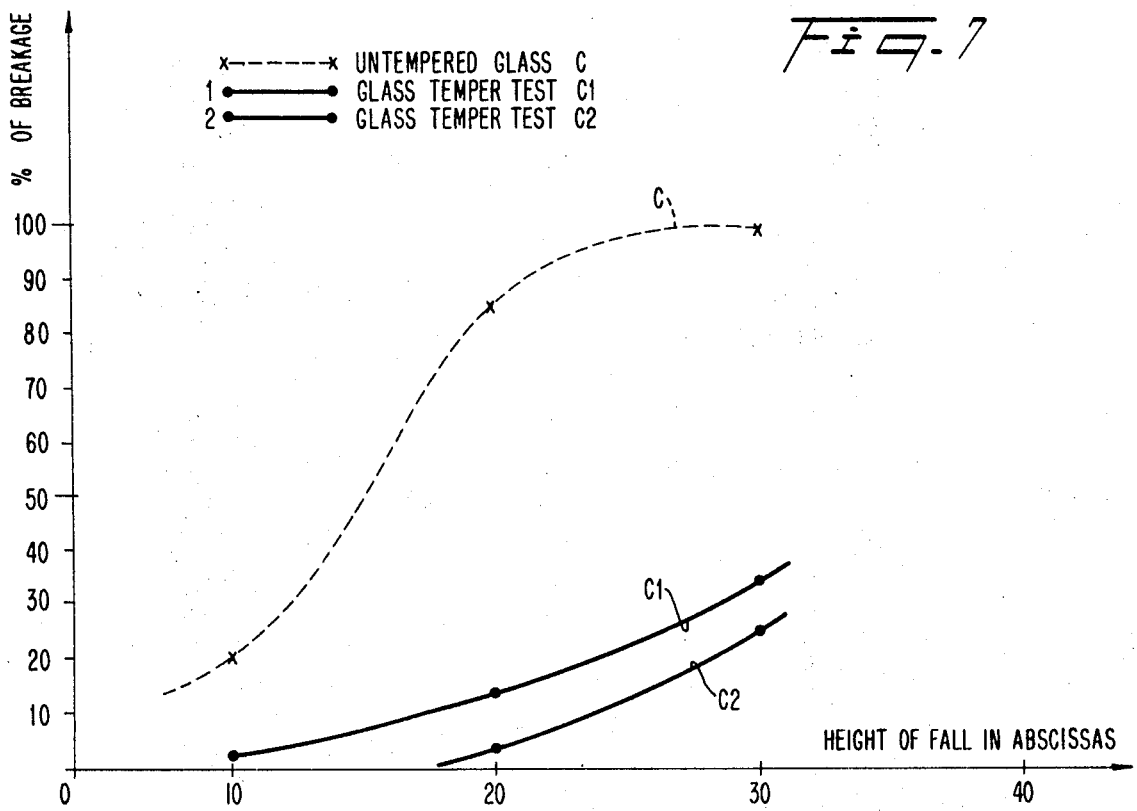
FIG. 7 is a graph illustrating the shock resistance of the new stemware compared to identical but untempered stemware.
Figure 8:
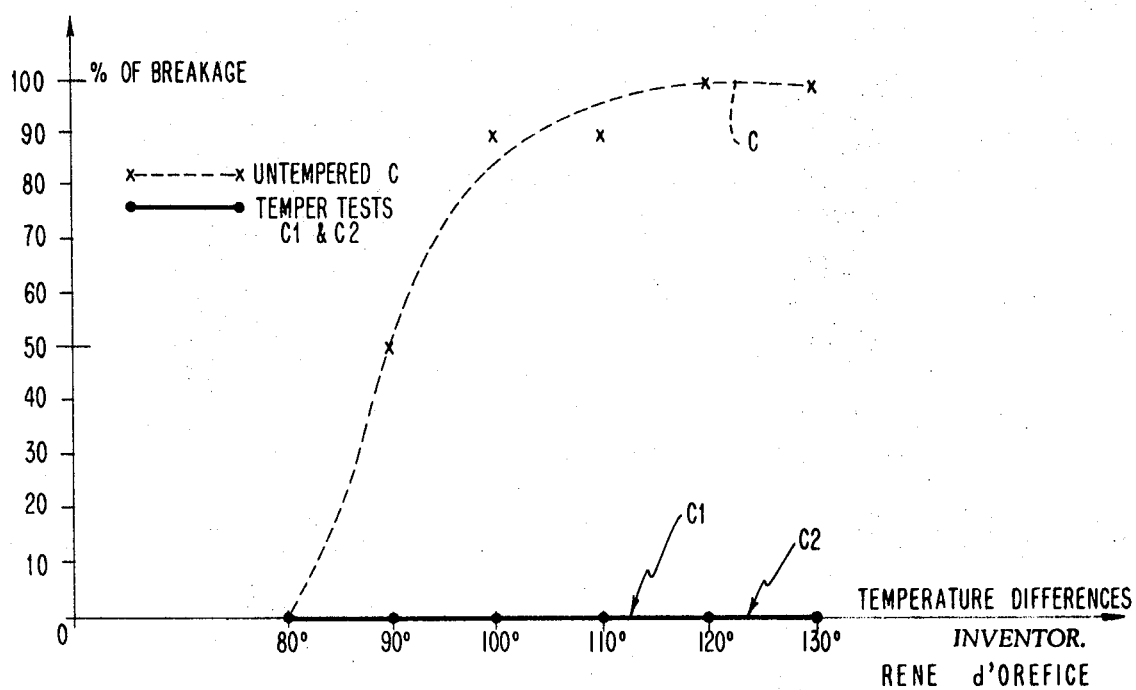
FIG. 8 is a graph illustrating the resistance of the new glassware to thermal shock, in comparison to identical glassware annealed but untempered.

The improved strength of the tempered glasses of this invention is equally shown by free fall tests. In such tests, the goblet is allowed to fall from different heights H (FIG. 6) through a guide tube 10 upon a steel block 11 of 30 mm. thickness which rests on a cement base 12. FIG. 7 shows the results of these tests, wherein the percentages of broken glasses are carried in ordinates and the height of the fall in abscissas. The tempered glasses are far more resistant than the untempered, it being noted that the latter had a 20 percent breakage for a 10 cm. fall against 0 and 2 percent for the tempered glasses. At a height of 20 cm. there was 85 percent breakage and at 30 cm. it became 100 percent for the untempered glasses, whereas at the same heights the breakage of tempered glass was respectively, 4 and 13 percent and 25 and 34 percent.

The new glassware was also subjected to thermal shock, again being tested against annealed but untempered glass of the same composition. In these tests the glasses were raised to a selected temperature in a furnace and then plunged into a water bath at lower temperature. In FIG. 7, the temperature difference between the water and the glass is shown in abscissas while the percentage of breakage is carried in ordinates. No tempered glass broke at a temperature difference of 130° C., whereas the untempered glasses had 50 percent breakage at a temperature difference of 90° C., the breakage becoming 90percent at a 100° difference and 100 percent for **° difference.

Figure 9:
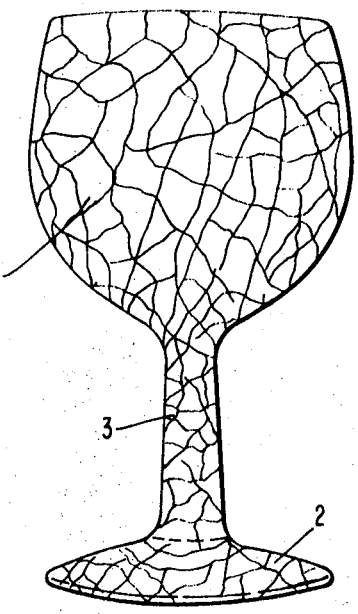
FIG. 9 is an elevation illustrating the breaking pattern of the tempered glass of this invention.
Figure 10:
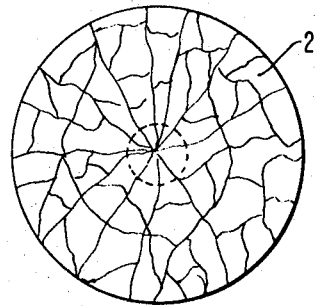
FIG. 10 is a bottom view of the foot of the glass of FIG. 9.

The tests show that the invention makes great improvement in the quality of the glassware. The invention makes tempering available for stemware and produces a stemware which is superior to that which was previously known. The stemware of this invention breaks in small fragments of uniform size as illustrated in FIGS. 9 and 10, the largest dimension of the fragments being less than 3 cm. in the operating conditions hereinabove set forth.

As many apparently widely different embodiments of the present invention may be made without departing from the spirit and scope thereof, it is to be understood that the invention is not limited to the specific embodiments.

What is claimed is:

1. A method of tempering glass stemware comprising cups, stems, and feet which comprises heating such ware to temperatures which decrease from above 600° C. at the rim of the foot to below 500° C. at midstem and increase thence to a maximum above about 650° C. below the rim of the cup, and chilling the stemware at a tempering rate.

2. A method of tempering glass stemware which comprises annealing the glass under conditions which produce in the cup surface temperatures of 660° to 680° C., and 490° to 500° C. in the midportion of the stem, and chilling the stemware at a tempering rate.

3. Tempered glass goblets comprising cups, stems, and feet of differing thickness varying from thinnest at the rim of the cup to thickest at the stem, the stem being on the order of several times the thickness of the upper part of the cup, having surface compression at least equal to 410 kg./cm.$^2$ and fragmenting into pieces less than 3 cm. in their largest dimension.

4. Tempered glass goblets according to claim 3 in which the stems are at least about four times the thickness of the upper part of the cups.

5. A method according to claim 2 which includes the steps of annealing the stemware at a temperature and for a time equivalent to about 3 minutes 15 seconds at about 720° C., blowing the outside of the stemware with air at room temperature and a relative pressure of 50 mm. of Hg., and blowing the inside of the cup with air at room temperature and a pressure of about 120 mm. of Hg.

UNITED STATES PATENT OFFICE
CERTIFICATE OF CORRECTION

Patent No. 3,608,766          Dated September 28, 1971

Inventor(s) Rene D'Orefice

It is certified that error appears in the above-identified patent and that said Letters Patent are hereby corrected as shown below:

On the Title Page, at "[73]" change "Compaznie" to -- Compagnie --; at "[31]", change "PU" to -- PV --. Column 3, line 27, change "**°" to -- 120° --.

Signed and sealed this 4th day of April 1972.

(SEAL)
Attest:

EDWARD M. FLETCHER, JR.        ROBERT GOTTSCHALK
Attesting Officer               Commissioner of Patents